United States Patent
Kremer et al.

(10) Patent No.: US 10,101,185 B2
(45) Date of Patent: Oct. 16, 2018

(54) METHOD AND MEASURING ASSEMBLY ACCORDING TO THE DIFFERENTIAL PRESSURE PRINCIPLE HAVING A ZERO-POINT CALIBRATION

(71) Applicant: S.K.I. GmbH, Mönchengladbach (DE)

(72) Inventors: Friedhelm Kremer, Mönchengladbach (DE); Michael Schlegel, Sindelfingen (DE)

(73) Assignee: S.K.I. GMBH, Mönchengladbach (DE)

( * ) Notice: Subject to any disclaimer, the term of this patent is extended or adjusted under 35 U.S.C. 154(b) by 151 days.

(21) Appl. No.: 15/105,395

(22) PCT Filed: Nov. 27, 2014

(86) PCT No.: PCT/EP2014/075815
§ 371 (c)(1),
(2) Date: Jun. 16, 2016

(87) PCT Pub. No.: WO2015/090895
PCT Pub. Date: Jun. 25, 2015

(65) Prior Publication Data
US 2016/0313153 A1    Oct. 27, 2016

(30) Foreign Application Priority Data
Dec. 19, 2013 (DE) .......... 10 2013 114 495

(51) Int. Cl.
*G01F 1/50* (2006.01)
*G01F 1/36* (2006.01)
*G01F 1/40* (2006.01)

(52) U.S. Cl.
CPC ............. *G01F 1/50* (2013.01); *G01F 1/36* (2013.01); *G01F 1/40* (2013.01)

(58) Field of Classification Search
None
See application file for complete search history.

(56) References Cited

U.S. PATENT DOCUMENTS

| 4,598,381 A | 6/1986 | Cucci |
| 4,655,074 A | 4/1987 | Robertson, Jr. et al. |

(Continued)

FOREIGN PATENT DOCUMENTS

| AT | 388809 B | 9/1989 |
| DE | 388809 C | 1/1924 |

(Continued)

*Primary Examiner* — Paul West
*Assistant Examiner* — Mark A Shabman
(74) *Attorney, Agent, or Firm* — BainwoodHuang

(57) ABSTRACT

In order to perform a zero-point calibration of a measuring assembly according to the differential pressure principle, which measuring assembly has a measuring transducer having a measuring cell, which measuring transducer is connected to at least one evaluating unit and at least one communication unit with regard to signaling, the digital signals provided to a communication unit are recorded. At least one characteristic value relevant to the zero-point calibration is determined from the digital signals. The at least one relevant characteristic value at a first time is stored as a reference characteristic value. At a second time lying after the first time, at least one relevant characteristic value is determined as a current characteristic value. A comparison of the reference characteristic value and the current characteristic value is performed. A zero-point calibration of the measuring assembly occurs if the result of the comparison lies outside of a specified tolerance.

9 Claims, 2 Drawing Sheets

(56) References Cited

U.S. PATENT DOCUMENTS

Figure 1:
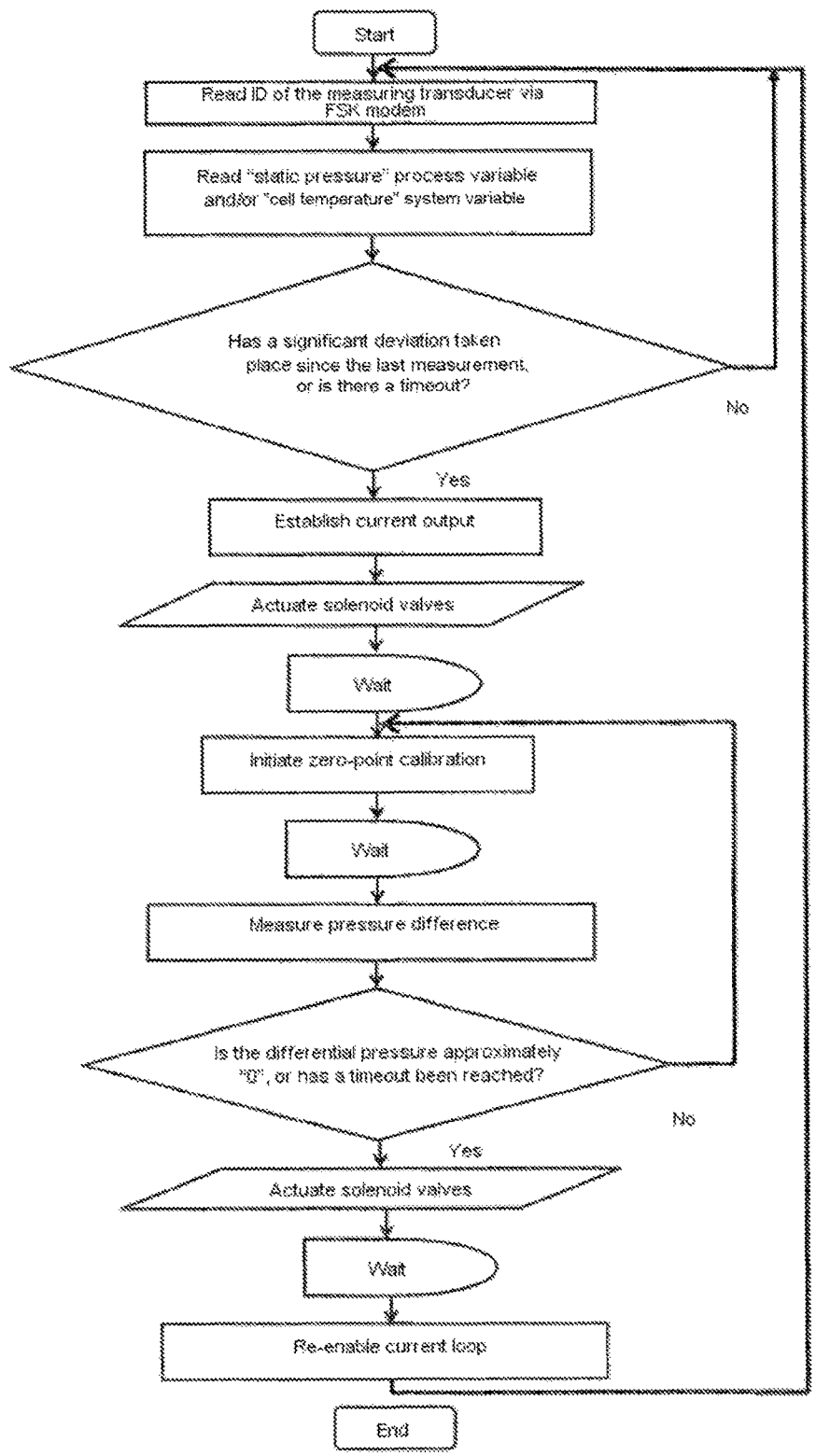

| | | | |
|---|---|---|---|
| 4,686,638 A | | 8/1987 | Furuse |
| 4,926,674 A | * | 5/1990 | Fossum .................. G01L 19/02 73/1.62 |
| 5,086,655 A | | 2/1992 | Fredericks et al. |
| 5,406,828 A | | 4/1995 | Hunter et al. |
| 2013/0098475 A1 | | 4/2013 | Jilderos |

FOREIGN PATENT DOCUMENTS

| | | |
|---|---|---|
| DE | 4408421 A1 | 9/1995 |
| DE | 69420853 T2 | 5/2000 |
| DE | 102010014693 B3 | 11/2011 |
| EP | 1528370 A2 | 5/2005 |
| GB | 1558884 A | 1/1980 |
| JP | 6238336 | 2/1987 |
| JP | 62116215 | 5/1987 |
| JP | 6311827 | 1/1988 |

* cited by examiner

METHOD AND MEASURING ASSEMBLY ACCORDING TO THE DIFFERENTIAL PRESSURE PRINCIPLE HAVING A ZERO-POINT CALIBRATION

The subject matter of the invention relates to methods and to a measuring arrangement according to the differential pressure principle with zero-point calibration.

Particularly for the flow measurement of fluids, it is known to use differential pressure sensors. A differential pressure sensor comprises, for example, an aperture which is installed in a line of the fluid. The free flow cross section is reduced by the aperture. As a result, a higher pressure is formed in front of the aperture by the reduced diameter. Behind the aperture, a lower pressure is formed. The differential pressure sensor is connected to a measuring arrangement, which operates according to the differential pressure principle.

The measuring arrangement comprises a measuring transducer, which delivers an electrical signal proportional to the differential pressure. The measuring transducer comprises a measurement cell. The measurement cell has two inputs, which are connected to the differential pressure sensor by means of differential pressure lines. The measurement cell comprises a measurement chamber, which is subdivided into a first chamber and a second chamber by a membrane having at least one pressure sensor. The first chamber is separated by a separating membrane from the first input, and the second chamber is separated by a separating membrane from the second input. There may be a filling liquid inside the chamber. The pressures prevailing in the chambers are transmitted via the separating membranes to the measurement membrane and to the pressure sensor. The pressure sensor delivers an electrical signal, which is optionally amplified and/or converted into a digital signal. The digital signal is processed further in a microcontroller and provided by corresponding interfaces to further system components, for example a HART modem.

It is known that, besides the differential pressure, information for example about the cell temperature, electronics temperature is also provided.

For the measurement accuracy, it is particularly important for a zero-point error to be as low as possible and detected promptly.

In general, a zero-point calibration is carried out manually. A differential pressure measurement cannot be carried out during the zero-point calibration, so that during this time a substitute value is provided in such a way that the user is provided with a plausible measurement value. The generation of the substitute value may in this case be carried out in a variety of ways. The procedure for carrying out a zero-point calibration and for generating a substitute value is described, for example, in specification AT 388 809 B.

In view of the fact that carrying out the zero-point calibration entails a not insignificant workload, in the general case a zero-point calibration is carried out only at sizeable time intervals. The time intervals may be predetermined. It is also known to make a zero-point calibration dependent as a function of an adjustable limit value of the measured pressure difference. The zero-point calibration is in this case, however, carried out not directly according to a manual calibration but virtually. For example, the output signal for zero-point conditions is measured and shifted according to an output characteristic curve. When a zero-point calibration is carried out in such a way, it may be referred to as a virtual zero-point calibration.

On the basis thereof, it is an object of the present invention to provide a method and a device for carrying out a zero-point calibration, which is an improvement over the prior art.

This object is achieved according to the invention by a method having features as disclosed herein. Further disclosed herein are features that relate to advantageous refinements and configurations of the method.

The method according to the invention for carrying out a zero-point calibration of a measuring arrangement according to the differential pressure principle, which has a measuring transducer comprising a measurement cell which is connectable by means of signal technology to at least one evaluation unit and at least one communication unit, is distinguished in that the digital signals provided to the communication unit are initially recorded. The communication unit is preferably a HART modem. It is, however, also possible to provide other equipment with other digital buses, such as PROFIBUS or MODBUS.

At least one characteristic quantity relevant to the zero-point calibration is determined from the digital signals. At least one relevant characteristic quantity is determined at a first point of time and stored as a reference characteristic quantity. At a second point of time, which lies after the first point of time, at least one current relevant characteristic quantity is determined. This current characteristic quantity is compared with the reference characteristic quantity. A zero-point calibration of the measuring arrangement is carried out when the result of the comparison lies outside a predetermined tolerance.

According to one advantageous refinement of the method, it is proposed that the current characteristic quantity is stored as the reference characteristic quantity after a zero-point calibration has been carried out. If the results of the comparison are stored, for example, then deviations from the specification of the measuring arrangement may be determined by suitable algorithms and used for preventive maintenance.

The current characteristic quantity may be determined continuously or at predetermined time intervals.

If a zero-point calibration is carried out, then a substitute value is provided to the evaluation unit during the zero-point calibration. The substitute value is preferably based on values which were determined at earlier points of time.

The at least one characteristic quantity is preferably a temperature of the measurement cell. Changes in the temperature of the measurement cell may have a significant influence on the zero point. In the known methods for carrying out a zero-point calibration, however, the effect of the temperature influences are only corrected purely by chance at the time when the zero-point calibration is carried out. The influence of the change in temperature on the zero-point shift may be reduced if the time intervals within which the zero-point calibration is intended to be carried out are reduced. This, however, leads to a reduction of the availability of the measuring arrangement.

In contrast to the previously known methods for zero-point calibration, which are time-controlled, a higher availability of the measuring arrangement can be achieved by the method according to the invention since the zero-point calibration is carried out essentially only once this is necessary because of the changes in the relevant characteristic quantity.

If the process pressure is also recorded by means of the measuring arrangement, then according to another advantageous refinement of the method it is proposed that the at least one characteristic quantity is a process pressure.

According to another inventive concept, a measuring arrangement according to the differential pressure principle is provided. The measuring arrangement comprises a measuring transducer which has a measurement cell. Connected to the measuring transducer by means of signal technology, there is an evaluation unit. A communication unit is provided, which is connected indirectly or directly by means of signal technology to the measuring transducer. The communication unit may also be a component of the evaluation unit.

The measuring arrangement according to the invention comprises a recording unit, which is suitable and intended to record the digital signals provided to the communication unit and to determine at least one characteristic quantity relevant to the zero-point calibration from the digital signals. In order to store at least one relevant characteristic quantity, which is assigned to a first point of time and is used as a reference characteristic quantity, a storage unit is provided. A current characteristic quantity, i.e. a relevant characteristic quantity which at a second point of time, which lies after the first point of time, is preferably also stored in the storage unit. A comparison between the reference characteristic quantity and the current characteristic quantity is carried out by means of a comparison unit. The comparison unit delivers an activation signal for carrying out a zero-point calibration of the measuring arrangement when the result of the comparison lies outside a predetermined tolerance.

The comparison unit may also be used to provide a substitute value, which is provided as an output signal for the final consumer during the zero-point calibration.

The features individually mentioned herein may be combined with one another in any technically expedient way, and may be supplemented with subject-matter from the description and details from the figures, wherein further alternative embodiments of the invention being presented thereby.

The invention and the technological scope will be explained in more detail below with the aid of the figures. The invention is not, however, restricted to the preferred exemplary embodiments represented.

FIG. 1 schematically shows a process sequence, and

Figure 2:
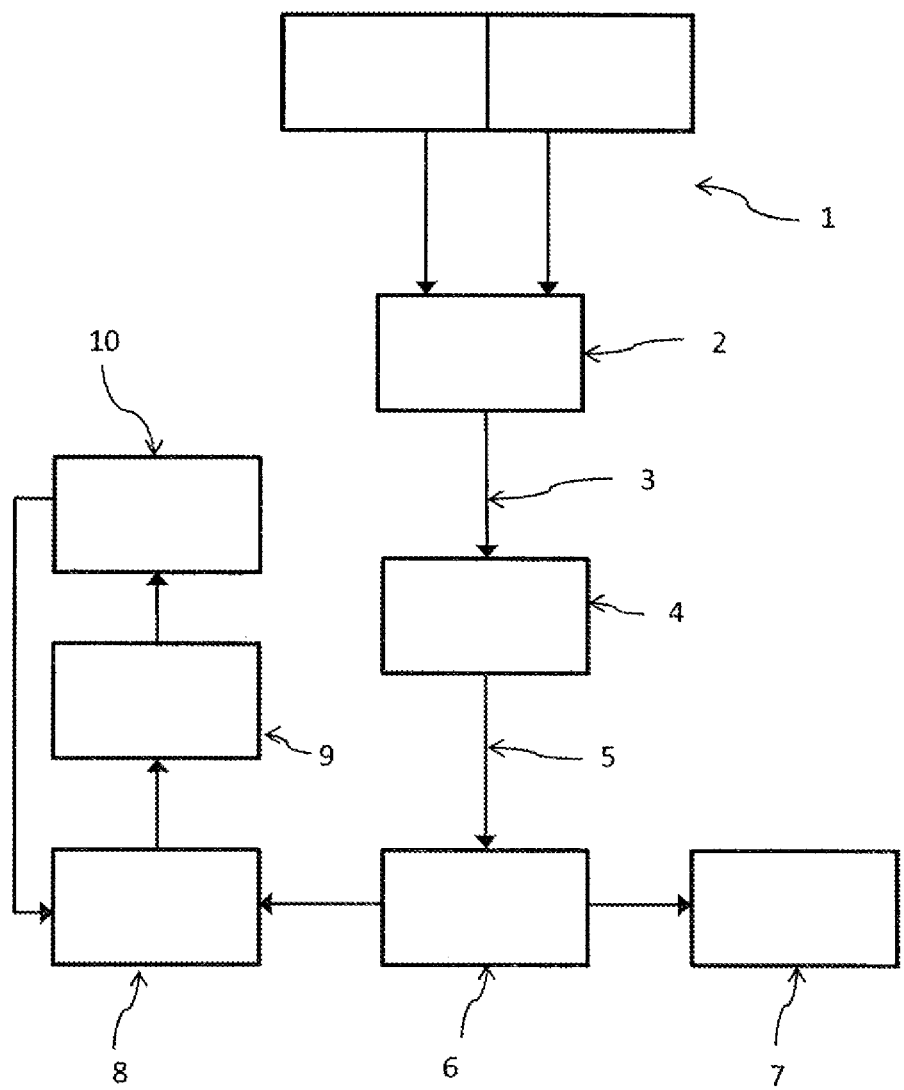

FIG. 2 schematically shows a measuring arrangement.

FIG. 1 schematically shows the sequence of a method for carrying out a zero-point calibration of a measuring arrangement according to the differential pressure principle, which has a measuring transducer comprising a measurement cell.

The measuring arrangement has a measuring transducer comprising a measurement cell, which can be connected by means of signal technology to at least one evaluation unit and at least one communication unit. By means of a communication unit, an ID of the measuring transducer is initially read out. The communication unit may, for example, be an FSK modem. The cell temperature and/or static pressure, for example, are read out as relevant characteristic quantities from the digital signals provided. A test is carried out as to whether there is a significant deviation between the current characteristic quantities and the characteristic quantities determined at an earlier point of time, which are stored as reference characteristic quantities. If the comparison between the at least one reference characteristic quantity and the at least one current characteristic quantity reveals that the result of the comparison lies outside a predetermined tolerance, then a zero-point calibration is carried out. During the zero-point calibration, a substitute value is provided since a measurement according to the differential pressure principle cannot be carried out during the zero-point calibration. A substitute value is provided to the final consumer as a fictitious measurement value.

With the initiation of a zero-point calibration, corresponding valves, preferably solenoid valves, are actuated and the actual zero-point calibration is carried out after a predetermined period of time. During the zero-point calibration, the differential pressure is measured. If the differential pressure is equal to zero, then the valves are opened. When there are new digital signals at the communication unit, the substitute value is deleted and the current measurement values are provided to the customer.

Solenoid valves are preferably used in order to carry out the zero-point calibration. With a first solenoid valve (isolation valve), a differential pressure line is separated from the process. The isolation valve is open in the currentless state. With a second valve (equalization valve), the two chambers which lie on either side of the measurement aperture of the differential pressure measuring transducer are connected during a zero-point calibration. This ensures that the differential pressure is equal to 0. In the currentless state, the equalization valve is closed.

If the equalization valve is not fully closed in the currentless state, this may lead to induction of the measured differential pressure and therefore a reduction of the measurement accuracy. Reliability can be increased when two equalization valves are connected in series. This also has the advantage of providing the possibility of carrying out a leak tightness test of the individual valves. To this end, one of the two equalization valves may respectively be opened at regular intervals during normal operation. If a reduction of the measured differential pressure is determined in this case, it may be assumed that the equalization valve which is still closed is leaking. Until replacement of the leaking valve, the measurement can be continued without affecting the accuracy.

The test as to whether one or all of the equalization valves is/are opened is possible independently of the number of equalization valves. If no significant reduction of the differential pressure can be measured after closure of the isolation valve and opening of the equalization valve, then it may be assumed that the equalization valve is not open. The measurement can continue to be carried out until replacement of the defective equalization valve. An automatic zero-point calibration is not, however, possible during this time.

A check of the leak tightness of the isolation valve is possible by opening the equalization valve after closure of the isolation valve. If the differential pressure is thereupon reduced but does not approach the value zero, it is likely that there is a leak. In this case, the equalization valve is closed again. If the differential pressure thereupon increases again, then the conclusion may be drawn that there is a leak of the isolation valve. The measurement may continue to be carried out until replacement of the isolation valve, although a zero-point calibration is not possible during this time.

In case the isolation valve does not open again after the zero-point calibration has been carried out, this reveals in that the measured differential pressure is unchanged after the instruction to open the valve. In this case, the valve must be replaced.

FIG. 2 schematically shows a measuring arrangement according to the differential pressure principle. A differential pressure sensor 1 is connected by means of signal technology to a measuring transducer 2. The measuring transducer has a measurement cell, which is known per se. The measurement cell has sensors, in particular pressure sensors and temperature sensors. The analog signals of the sensors may be amplified and converted into digital signals, which may be carried out in a structural unit 4. The structural unit 4 delivers digital signals to an evaluation unit 6, which is for example connected to a display installation 7. The reference numeral 8 denotes a communication unit, which in the exemplary embodiment represented is connected indirectly by means of signal technology to the measuring transducer. The digital signals provided to the communication unit 8 are recorded by means of a recording unit 9. A reference characteristic quantity and a current characteristic quantity are evaluated in a storage unit and a comparison unit, which for example is configured in the form of a microcomputer. An activation signal for carrying out a zero-point calibration of the measuring arrangement is generated as a function of the comparison between a reference characteristic quantity and the current characteristic quantity.

The invention claimed is:

1. Method for carrying out a zero-point calibration of a measuring arrangement according to the differential pressure principle, which has a measuring transducer comprising a measurement cell which is electrically coupled to at least one evaluation unit and at least one communication unit, wherein
   a) digital signals provided to the communication unit are recorded;
   b) at least one characteristic quantity that exerts influence on the zero-point calibration is determined from the digital signals;
   c) the at least one characteristic quantity is stored at a first point of time as a reference characteristic quantity;
   d) the at least one characteristic quantity is determined at a second point of time as a current characteristic quantity, which lies after the first point of time;
   e) a comparison between the reference characteristic quantity and the current characteristic quantity is carried out;
   f) a zero-point calibration of the measuring arrangement is carried out when a result of the comparison lies outside a predetermined tolerance; and
   wherein the at least one characteristic quantity includes at least one of a temperature of the measurement cell and a process pressure.

2. Method as claimed in claim 1, wherein the current characteristic quantity is stored as the reference characteristic quantity after the zero-point calibration has been carried out according to step f).

3. Method as claimed in claim 1, wherein the current characteristic quantity is determined continuously.

4. Method as claimed in claim 1, wherein the current characteristic quantity is determined at predetermined time intervals.

5. Method as claimed in claim 1, wherein a substitute value is provided to the evaluation unit during a zero-point calibration.

6. Method as claimed in claim 1, wherein each characteristic quantity is a temperature of the measurement cell.

7. Method as claimed in claim 1, wherein each characteristic quantity is a process pressure.

8. Measuring arrangement according to the differential pressure principle, comprising
   a measuring transducer which has a measurement cell,
   an evaluation unit which is electrically coupled to the measuring transducer,
   a communication unit which is electrically coupled to the measuring transducer,
   a recording unit which is suitable and intended to record digital signals provided to the communication unit and to determine at least one characteristic quantity that exerts influence on the zero-point calibration from the digital signals,
   a storage unit for storing at least one characteristic quantity at a first point of time as a reference characteristic quantity and at least one characteristic quantity at a second point of time as a current characteristic quantity, which lies after the first point of time,
   a comparison unit which performs a comparison between the reference characteristic quantity and the current characteristic quantity,
   and which delivers an activation signal for carrying out a zero-point calibration of the measuring arrangement when a result of the comparison lies outside a predetermined tolerance; and
   wherein the at least one characteristic quantity includes at least one of a temperature of the measurement cell and a process pressure.

9. A method of carrying out a zero-point calibration of a differential pressure sensor assembly, the method comprising:
   recording digital signals while the digital signals are provided from the differential pressure sensor assembly to a communication unit, the differential pressure sensor assembly having a measuring transducer which includes a measuring cell, the measuring transducer being electrically connected to at least one of an evaluation unit and the communication unit,
   determining, from the digital signals, a reference set of characteristic quantities that exerts influence on the zero-point calibration,
   at a first point in time, storing the reference set of characteristic quantities in a recording unit,
   at a second point of time which is after the first point of time, determining, from the digital signals, a current set of characteristic quantities that exerts influence on the zero-point calibration, and
   based on the reference set of characteristic quantities stored in the recording unit and the current set of characteristic quantities, performing a set of operations which includes:
   (i) comparing the reference set of characteristic quantities stored in the recording unit and the current set of characteristic quantities,
   (ii) performing zero-point calibration of the differential pressure sensor assembly when a result of the comparison lies outside a predetermined tolerance, and
   (iii) refraining from performing the zero-point calibration of the differential pressure sensor assembly when the result of the comparison does not lie outside the predetermined tolerance,
   wherein the method is repeated at least once and the zero-point calibration of the differential pressure sensor assembly is performed at least once during operation of the differential pressure sensor assembly, and
   wherein the reference set of characteristic quantities includes at least one of a temperature of the measurement cell and a process pressure.

* * * * *